United States Patent Office 3,451,988
Patented June 24, 1969

3,451,988
POLYMERIZATION CATALYST AND USES
THEREOF
Arthur W. Langer, Jr., Watchung, N.J., assignor to Esso Research and Engineering Company, a corporation of Delaware
No Drawing. Continuation-in-part of applications Ser. No. 266,188, Mar. 19, 1963, and Ser. No. 290,315, June 25, 1963. This application Oct. 25, 1966, Ser. No. 589,240
Int. Cl. C08f 1/28, 3/06; C08d 1/14
U.S. Cl. 260—94.6                                20 Claims

ABSTRACT OF THE DISCLOSURE

A polymerization catalyst is prepared by mixing an organolithium such as n-butyl lithium with a chelating bifunctional Lewis base such as tetramethyl ethylene diamine. The catalyst is useful for the polymerization of ethylene and homopolymerization or copolymerization of diolefins such as butadiene-1,3.

---

This invention relates to improved catalyst systems for the polymerization of ethylene or conjugated diolefins and the products obtained thereby. More particularly, it relates to the indicated polymerization with a catalyst system comprising an organometal in combination with a bifunctional Lewis base.

This application is a continuation-in-part of copending applications Ser. No. 266,188, filed Mar. 19, 1963, and now abandoned, entitled "Polymerization Catalyst" and Ser. No. 290,315, filed June 25, 1963, and now abandoned, entitled "Polymerization of Conjugated Diolefins."

The polymerization of ethylene in the presence of a catalyst system comprising transition metals and organometals is well known. The preferred group of these catalysts is that disclosed in Belgian Patent No. 533,362, issued May 16, 1955, to Ziegler, namely, catalysts prepared by the interaction of a trialkyl aluminum with a compound of a metal of Group IV$b$, V$b$, or VI$b$ of the Periodic System, including thorium and uranium, and especially compounds of titanium, zirconium and chromium.

By comparison, little art is available on the polymerization of ethylene by organometals in the absence of transition metal compounds or other heterogenous components. In general, the available art on the polymerization of ethylene with nontransition metal compounds relates to the use of organometals as the sole catalyst, see Ziegler, Ann. 567, 195 (1950) and Hanford, Roland and Sargent, U.S. Patent No. 2,377,779, issued June 5, 1945.

Ethylene polymerization processes utilizing transition metal compounds as part of the catalyst system are disadvantageous in that the catalyst system is heterogenous, thus resulting in products having a rather wide molecular weight distribution, i.e. the polymer is not uniform. In addition, these catalysts are insoluble in the polymerization medium, thus necessitating additional processing to remove the catalyst residues from the polymeric product. Further, catalyst systems containing transition metal compounds are relatively expensive and may produce such adverse side reactions as oxidation of the polymer, formation of color bodies in the polymer, and the like.

The disadvantages attendant to the use of transition metal-organometal catalyst systems may be obviated by the use of an organometal as the sole catalyst. However, ethylene polymerization processes which utilize organometals (wherein the metal is a nontransition metal) as the sole catalyst have heretofore resulted in the production of low molecular weight, i.e. not "plastic-grade," polyethylene. Ethylene polymerization with lithium alkyls are slow and side reactions prevent the formation of long polymeric chains, see Gilman and Eisch, Scientific American, pages 94–96, January 1963 and G. Natta, J. Inorg and Nuclear Chem., 8, 600 (1958). "Plastic-grade" as used herein denotes linear polyethylene having a minimum Harris molecular weight of about 40,000, or a minimum intrinsic viscosity of about 1.0.

The polymerization of conjugated diolefins to rubbery polymers using lithium hydrocarbon catalysts is well known. Normally the polymerization of a conjugated diolefin, e.g., butadiene-1,3, with n-butyllithium in a hydrocarbon diluent gives a product with about 90% 1,4 structure and 10% 1,2 structure. It can be desirable to increase the ratio of 1,2 structure because this increases the cure of liquid polydiolefins. Also, in the rubbery molecular weight range, the processability is increased as well as cure rate.

In this invention, a new class of compounds has been found which has had the unexpected ability for increasing the catalytic activity of organometals. These compounds are known as bifunctional Lewis bases. The catalyst system, comprising an organometal and a bifunctional Lewis base, is soluble in the polymerization medium, thus facilitating the separation of the polymeric product from the catalyst residue. In addition, since the catalyst system is homogenous, its use in the polymerization of ethylene results in the production of polyethylene with a narrow molecular weight range, i.e. polyethylene which is highly uniform.

The marked increase in catalytic activity resulting from the addition of a bifunctional Lewis base to the organometal (wherein the metal is a nontransition metal) is surprising in several respects: the bifunctional Lewis bases are, per se, catalytically inert and thus no polymers result in the absence of the organometal; the use of organometals in the absence of a bifunctional Lewis base results in the production of low molecular weight polymers whereas the combination of the bifunctional Lewis base and the organometal results in the production of a high molecular weight polymer, i.e. "plastic-grade"; aging the catalyst system, i.e. the organometal in combination with the bifunctional Lewis base, prior to the polymerization reaction, results in the production of high Harris molecular weight, i.e., about 40,000 to 1,000,000 or higher, linear polymers which have heretofore been available only when monomers are polymerized with catalyst systems containing transition metal compounds.

It has also been found that polydiolefins having increased ratios of 1,2 structure can be obtained at increased polymerization rates by polymerizing conjugated diolefins in the additional presence of catalytic amounts of certain chelating bifunctional Lewis bases to be described below. This is surprising in several respects: (a) the chelating bifunctional Lewis base is, per se, catalytically inert, i.e., no polymer is formed in the absence of an organometal; (b) the use of an organometal in the absence of a chelating bifunctional Lewis base results in the production of polydiolefins whose structure is predominately 1,4; and (c) the increased ratio of 1,2 structure of polydiolefins has heretofore been achieved only by the use of large amounts, i.e., solvent quantities, of monofunctional Lewis bases, e.g., tetrahydrofuran, diethyl ether, triethylamine, in the polymerization process. Processes utilizing large amounts of these monofunctional Lewis bases are, in general, uneconomical since the inexpensive hydrocarbon diluents are the preferred vehicles when the polydiolefins are marketed in solution form.

In this invention, polyethylene as well as liquid and rubbery polydiolefins having increased ratios of 1,2 structure are prepared by polymerizing ethylene or conjugated diolefins in the presence or absence of a liquid hydrocarbon diluent and catalytic amounts of an organometal and a chelating bifunctional Lewis base. Thus, the need for removal and recovery of a monofunctional Lewis base and re-dissolution of the polyethylene or polydiolefin in a hydrocarbon diluent is eliminated. The use of catalytic amounts of a chelating bifunctional Lewis base affords higher polymerization rates than those processes utilizing large amounts of tetrahydrofuran, the most effective monofunctional Lewis base known to the art.

Heretofore, ethylene or conjugated diolefins could be polymerized with the aid of lithium hydrocarbon catalysts only in the additional presence of a hydrocarbon diluent (thereby resulting in polydiolefins with a high 1,4 structure) or a monofunctional Lewis base as a diluent. It has now been found that polyethylene or polydiolefins having high 1,2 structures can be prepared with the aid of catalytic amounts of a lithium hydrocarbon catalyst and a chelating bifunctional Lewis base in the substantial absence of any diluent whatsoever.

The instant catalyst system may be employed for the following types of polymerization reactions:

(a) Homopolymerization of ethylene to solid, high molecular weight polymeric products;

(b) Copolymerization of ethylene with other $C_3$ to $C_{10}$ olefins to solid, high molecular weight porducts;

(c) Homopolymerization of $C_4$–$C_{12}$ conjugated diolefins to liquid or rubbery polydiolefins having high ratios of 1,2 structure;

(d) Copolymerization of $C_4$–$C_{12}$ conjugated diolefins with each other or with polar monomers containing 3 to 10 carbon atoms to liquid, solid or rubbery prducts.

The process of this invention is applicable to the preparation of either random or block copolymers; block copolymerizations are especially facilitated by the use of this catalyst system. Suitable examples of monomers which may be copolymerized with ethylene with the catalyst system of this invention include straight chain alpha monoolefins such as butene-1, hexene-1, and the like; branched chain alpha monolefins such as 3-methyl-1-butene, and the like; vinyl aromatics such as styrene and the like; straight chain diolefins such as butadiene-1,3 and the like; cyclic diolefins such as dicyclopentadiene and the like; cyclic monoolefins such as cyclopentene and the like. Suitable examples of the polar monomers which may be copolymerized with a conjugated diolefin include styrene, alpha methyl styrene, vinyl chloride, acrylonitrile, and the like.

Since the catalysts of this invention markedly influence the polymerization rates and reactivity ratios of the monomer pairs in copolymerizations, diverse copolymer compositions, block distributions and microstructures can be obtained. For example, a catalyst comprising n-butyllithium and N,N,N',N'-tetramethyl-1,2-ethanediamine is considerably more effective in bringing about the copolymerization of butadiene-1,3 and styrene than is n-butyllithium alone or n-butyllithium plus tetrahydrofuran. By employing equimolar amounts of butadiene-1,3 and styrene in the feed stream, the catalysts of this process can bring about the production of copolymers which contain approximately the same ratio of butadiene-1,3 and styrene as was present in the feed stream; in contradistinction, n-butyllithium alone or in combination with tetrahydrofuran results in the production of a copolymer relatively low in styrene content as long as any butadiene-1,3 is present. Hence the catalsyts of this process produce copolymers which have a relatively uniform composition independent of monomer conversion rates.

The conjugated diolefins which can be employed in this process are aliphatic, cycloaliphatic and aromatic hydrocarbons containing 4 to 12 carbon atoms. Suitable nonlimiting examples include butadiene-1,3, isoprene, the 2-alkyl-1,3-butadienes, the 2,3-dialkyl-1,3-butadienes, piperylene, hexadiene-1,3, hexadiene-2,4, cyclohexadiene-1,3, 1-phenylbutadiene-1,3, 2-phenylbutadiene-1,3, and the like. The process is particularly effective for isoprene and butadiene-1,3 and especially useful with the latter.

The first component of the catalyst system of this invention comprises an organometal which is selected from the group consisting of RLi and $R_2Mg$. R may be the same or different monovalent hydrocarbon radicals of 1 to 16 carbon atoms. Examples of suitable R groups include aryl radicals and aliphatic radicals or derivatives such as alkyl, cycloalkyl-alkyl, cycloalkenyl-alkyl, arylalkyl, cycloalkyl, aryl-cycloalkyl, cycloalkyl alkenyl, alkylaryl or cycloalkyl-aryl radicals and the like.

Specific examples of R groups for substitution in the above formula include methyl, ethyl, n-propyl, isopropyl, n-butyl, isobutyl, t-butyl, n-amyl, isoamyl, n-hexyl, n-octyl, n-decyl, and the like; allyl, 2-butenyl, 2-methyl-2-butenyl and the like; cyclopentyl-methyl, cyclohexyl-ethyl, cyclopentyl-ethyl, methylcyclopentyl-ethyl, 4-cyclohexenylethyl, and the like; 2-phenylethyl, 2-phenylpropyl, α-naphthylethyl, methylnaphthylethyl, and the like; cyclopentyl, cyclohexyl, 2,2,1-bicycloheptyl, and the like; methylcyclopentyl, dimethylcyclopentyl, ethylcyclopentyl, methylcyclohexyl, dimethylcyclohexyl, ethylcyclohexyl, isopropylcyclohexyl, 5-cyclopentadienyl, and the like; phenylcyclopentyl, phenylcyclohexyl, the corresponding naphthyl derivatives of cycloalkyl groups, and the like; phenyl, tolyl, xylyl, ethylphenyl, naphthyl, methylnaphthy, dimethylnaphthyl, ethylnaphthyl, cyclohexylphenyl and the like.

Preferably, the first component is an alkyl magnesium or alkyl lithium wherein the alkyl radical contains 2 to 6 carbon atoms. Particularly preferred herein is n-butyllithium.

The second component of the catalyst system of this invention comprises a bifunctional Lewis base which is capable of chelating with the above-mentioned first catalyst component and is selected from the group consisting of di-(tertiary)-amines and tertiary aminoethers having the formulas:

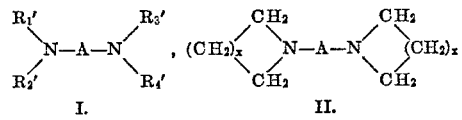

or

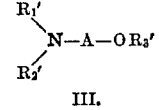

III.

Formulas I and II may be employed in ethylene polymerizations while Formulas I, II and III may be employed in the polymerization of conjugated diolefins. In the above formulas, $R_1'$, $R_2'$, $R_3'$ and $R_4'$ are the same or different alkyl radicals of 1 to 4 carbon atoms inclusive, A is a nonreactive group and X is an integer of 0 to 3 inclusive.

For the purposes of this invention, A in the above formulas, is selected from the group consisting of: (1) cycloaliphatic and aromatic radicals and their lower alkyl derivatives having ring structures containing 5 to 7 members, wherein said radicals are attached to the nitrogen atoms at adjacent positions on the rings; suitable examples include N,N,N',N'-tetramethyl-1, 2-cyclopentanediamine, N,N,N',N'-tetramethyl-1, 2-cyclohexanediamine, N,N,N',N'-tetramethyl-o-phenylenediamine, 4-ethyl-N,N, N',N'-tetramethyl-o-phenylenediamine, and the like; (2) monoalkyl phosphorus radicals having 1 to 8 carbon atoms; suitable examples include N,N,N',N'-tetramethylethylphosphonamidite, i.e. $(C_2H_5P[N(CH_3)_2]_2)$, N,N, N',N',-tetramethyl-n-butylphosphonamidite, and the like; (3) a monoethylenic radical, said radical containing 0 to 2 monovalent hydrocarbon radicals of 1 to 8 carbon atoms; suitable examples include N,N,N',N',-tetramethyl-1,2-diaminoethylene, N,N,N',N'-tetramethyl-3,4-diaminohexene-3, and the like; and (4) 1 to 4 methylenic radicals inclusive, wherein each methylenic radical contains 0 to 2 monovalent hydrocarbon radicals of 1 to 6 carbon atoms; suitable examples include 1,2-dipiperidyl ethane, N,N'-dimethyl-N,N'-diethyl-1,2-ethanediamine, N,N,N', N'-tetramethyl-1-phenyl-1,2-ethanediamine, N,N,N',N'-tetramethyl-1,2-pentanediamine, N,N,N',N'-tetramethyl-1,2-propanediamine, N,N,N',N'-tetramethyl-2,3-butanediamine, N,N,N',N'-tetramethyl-1,4-butanediamine, methyl beta-dimethyl aminoethyl ether, ethyl beta-diethyl aminoethyl ether, and the like.

Particularly valuable as a second catalyst component is an organic diamine having the general formula:

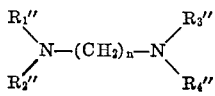

wherein $R_1''$, $R_2''$, $R_3''$ and $R_4''$ are the same or different alkyl radicals of 1 to 3 carbon atoms inclusive and $n$ is an integer between 1 and 4 inclusive. Suitable examples include: N,N,N',N'-tetramethylmethanediamine, N,N-dimethyl-N',N'-diethyl-1,2-ethanediamine, N,N,N',N'-tetramethyl - 1,2 - ethanediamine, N,N,N',N' - tetraethyl - 1,2-ethanediamine, N,N,N',N' - tetramethyl - 1,3 - propanediamine, N,N,N',N'-tetramethyl-1,4-butanediamine, and the like. Particularly preferred herein is N,N,N',N'-tetramethyl-1,2-ethanediamine.

In preparing and using catalysts according to this invention, all steps should be carried out in the substantial absence of oxygen, moisture, carbon dioxide or other harmful impurities. This can be readily accomplished by blanketing all the raw materials, i.e., the catalyst components, monomers, inert diluents, etc. with an inert gas such as dry nitrogen or argon. Electron donors such as amines, mercaptans, ketones, aldehydes, etc. are generally poisonous to the catalysts and preferably the monomers should contain less than about 200 p.p.m. and the diluent less than about 50 p.p.m. by weight of these impurities. Preferably all materials are purified, e.g. by drying, distillation, etc. prior to their use.

In practicing one embodiment of this invention, it is generally desirable to prepare the catalyst system by mixing the selected organometal (i.e. the first component) with the selected bifunctional Lewis base. Although a catalyst system comprising one organometal and one bifunctional base is preferred, mixtures of organometals and bifunctional Lewis bases may also be employed. Generally, the molar ratio of the organometal to the bifunctional Lewis base is about 0.1:1 to 10:1, preferably 0.5:1 to 2:1.

As a matter of convenience, it is generally preferred to mix the catalyst components in the presence of an inert organic diluent. The diluent, which can also serve as the polymerization medium, should be a liquid at the operating conditions of the polymerization reaction. If a diluent is employed in preparing the catalyst system and the catalyst system is used in the homopolymerization of ethylene or copolymerization of ethylene with other $C_3$–$C_{10}$ olefins, the diluent should be a saturated aliphatic or saturated cycloaliphatic hydrocarbon having 2 to 20 carbon atoms such as pentane, isopentane, hexane, heptane, isooctane, cyclopentane, cyclohexane, cyclooctane, decahydronaphthalene, decane, hexadecane, and the like. On the other hand, if the catalyst system is to be used in the homopolymerization of $C_4$–$C_{12}$ conjugated diolefins or copolymerization of $C_4$–$C_{12}$ conjugated diolefins with each other or with $C_3$–$C_{10}$ polar monomers, the diluent may be a $C_2$ to $C_{20}$ saturated aliphatic or saturated cycloaliphatic hydrocarbon such as those described above or a $C_6$ to $C_{20}$ aromatic hydrocarbon such as benzene, toluene, ethylbenzene, the xylenes, naphthalene, tetrahydronaphthalene and the like.

In preparing the catalyst, sufficient amounts of the diluent are preferably employed such that the concentration of the catalyst is normally in the range of about 0.001 to 50 g./l., preferably 0.1 to 20 g./l., based on the diluent. The temperature required for the catalyst preparation is not critical, hence as a matter of convenience, the catalyst can be prepared at temperatures ranging from −80° to 100° C., preferably 0° to 50° C. Since the catalyst components, after mixing, normally result in a liquid mixture, the catalyst can be conveniently prepared at atmospheric pressure. If desired, the catalyst components can be mixed in situ, i.e. by placing each separate catalyst component in the polymerization reactor which preferably, but not necessarily, contains a hydrocarbon diluent of the type described above, adding the selected monomer or monomer mixture and allowing the catalyst components to be admixed as the polymerization or copolymerization reaction proceeds.

In practicing one embodiment of this invention, the catalyst is placed in the polymerization reactor and ethylene (or a mixture of ethylene and $C_3$–$C_{10}$ olefins) is introduced into the reactor; it should be understood that the conditions which follow for the homopolymerization of ethylene apply also to the copolymerization of ethylene and $C_3$–$C_{10}$ olefin mixtures. Although ethylene may be polymerized in the absence of a diluent, if no diluent has been employed in the catalyst preparation, it is desirable to add sufficient amounts of an above-mentioned diluent prior to injection of the ethylene. High ethylene concentrations are preferred and when a diluent is used in the polymerization reaction, the minimum ethylene concentration in the diluent should be about 5 wt. percent, preferably 10 wt. percent, based on the weight of diluent. The polymerization reaction is then carried out at a temperature of about 0 to 100° C., preferably 20 to 80° C. Ethylene is allowed to remain in contact with the catalyst system for about 0.1 to 10 hours, preferably 0.5 to 4 hours, during which time more ethylene may be added so as to maintain the total pressure at the desired level which may be as low as atmospheric and as high as 30,000 p.s.i.g. or higher if necessary, but preferably is in the range of 500 to 25,000 p.s.i.g.

The amount of ethylene added will, of course, be determined by the age of the catalyst, reaction time, diluent volume, desired monomer conversion, etc. but may advantageously be in the range of about 50 g. to about 5000 g. monomer per g. total catalyst when the reaction is carried out batchwise. Normally it is desirable for good operability to limit the concentration of ploymer in the diluent to less than 25 wt. percent. If necessary, the polymer concentration may be maintained at or below this level by the addition of more diluent during the polymerization reaction.

At the end of the reaction, the solid polymer is precipitated with about 0.1 to 100 volumes of a $C_1$ to $C_6$ alcohol such as methyl alcohol, isopropyl alcohol, n-butyl alcohol, and the like. The precipitated product is then filtered and washed with more alcohol and may then be finished by the addition of suitable stabilizers and inhibitors followed by drying according to methods now well known in the polymer field. If desired, the product may be extracted with acids, bases, complexing agents, etc., in order to reduce catalyst residues to a low level prior to the addition of stabilizers or inhibitors.

The polymerization reaction may, of course, also be carried out as a continuous operation in which case the catalyst components, preferably mixed with sufficient diluent, may be continuously added to the reactor either separately or previously combined. Separate streams of additional diluent may also be continuously added so as to maintain a suitable polymer concentration in the diluent, achieve desirable monomer conversion, and obtain a high catalyst efficiency, i.e., in the range of 50 to 1000 g. polymer per g. catalyst.

In practicing another embodiment of this invention, the conjugated diolefins are polymerized to polymeric products having a high ratio of 1,2 structure in the presence or absence of a hydrocarbon diluent of the type described above; the conditions which follow are, of course, applicable to the copolymerization of mixtures of conjugated diolefins with themselves or with $C_3$–$C_{10}$ polar monomers. After the catalyst has been prepared, it is placed in the reactor and the selected diolefin and optionally a sufficient amount of the hydrocarbon diluent are introduced into the reactor. The conjugated diolefin concentration based on the diluent can be as low as 1 wt. percent or as high as 100 wt. percent, but is preferably 10 to 50 wt. percent. The polymerization reaction is then carried out at a temperature of about −100° to 100° C., preferably −60° to 80° C. The conjugated diolefin is allowed to remain in contact with the catalyst for about 0.1 to 10 hours, preferably 0.5 to 4 hours, during which time more conjugated diolefin may be added so as to maintain the monomer concentration at the desired level. Atmospheric pressure is generally satisfactory although pressures up to 500 p.s.i.g. or more can be used.

The amount of conjugated diolefin added will, of course, be determined by the desired molecular weight of the polymer, reaction time, type of diluent, desired monomer conversion, etc., but can advantageously be in the range of about 100 g. to 10,000 g. conjugated diolefin per g. total catalyst when the reaction is carried out batch-wise. Normally, it is preferable for good operability to limit concentration of high molecular weight polymer in the reaction mixture to less than 50 wt. percent; if necessary, the polymer concentration can be maintained at or below this level by the addition of more conjugated diolefin and/or more diluent during the polymerization reaction.

When the desired degree of polymerization has been reached, the polydiolefin can be isolated by the addition of a nonsolvent such as methyl alcohol, isopropyl alcohol, water, etc. Alternatively, the reaction mixture can be injected into a slurry tank containing a hot nonsolvent whereupon the solvent is flashed off and the polydiolefin remains as a slurry with the nonsolvent; if desired, the solvent can also be removed directly by the application of heat and/or flashing to a lower pressure. If the polydiolefinic products are to be utilized in a hydrocarbon solution form, simple water washing of the reaction mixture at room temperature will suffice to remove catalyst residues.

Normally the polymerization of conjugated diolefins in the presence of an organometal catalyst results in the production of substantially rubbery polydiolefins, i.e., polymeric products having a viscosity average molecular weight in the range of about 30,000 to 500,000 or higher (the inherent viscosities of the polydiolefins are determined from the toluene solution viscosities measured at 20° C.). The viscosity average molecular weight of the rubbery polydiolefins is dependent upon the ratio of the conjugated diolefins to the organometal. These substantially rubbery polydiolefins (also termed "living polymers" since the polymeric chain continues to grow until the diolefin has been completely consumed) can be prepared by conducting the polymerization reaction either in the substantial absence of any diluent or in the presence of 2 to 98 wt. percent, based on the total reaction mixture, of an aliphatic or cycloaliphatic diluent of the type described above, e.g., pentane, isooctane, hexadecane, cyclohexane, etc. In general the polymerization reaction leading to the preparation of substantially rubbery polydiolefins is carried out at a temperature in the range of −100° to 80° C., and the preferred catalyst combination for the preparation of the substantially rubbery polydiolefins is an alkyl lithium having 2 to 8 carbon atoms, e.g., n-butyllithium, and a diamine selected from the group having the formula:

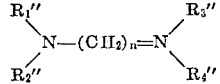

wherein $R_1''$, $R_2''$, $R_3''$, and $R_4''$ are the same or different alkyl radicals of 1 to 3 carbon atoms inclusive and $n$ is an integer between 1 and 4 inclusive, e.g., N,N,N',N'-tetramethyl-1,2-ethanediamine.

It has been found that substantially liquid polydiolefins with a viscosity average molecular weight of about 200 to about 30,000 can be prepared by polymerizing the conjugated diolefins in the presence of an aromatic diluent of the type described above, e.g., benzene, toluene, etc., rather than in the presence of an aliphatic or cycloaliphatic diluent or in the substantial absence of any diluent. Although the same catalyst components described above for the preparation of substantially rubbery polydiolefins can be utilized for the preparation of substantially liquid polydiolefins, the "living polymer" reaction does not take place since the aromatic diluent can act as a chain transfer agent and terminate the polymeric chain thus resulting in the production of substantially liquid, low viscosity average molecular weight polydiolefins. The point at which the polymeric chain is terminated depends upon the particular aromatic diluent selected and the temperature of the polymerization reaction which can be as low as 0° C. or as high as 100° C., but is preferably in the range of 10° to 70° C. Thus by varying the selection of the aromatic diluent and/or the polymerization reaction temperature, substantially liquid polydiolefins of any particular viscosity average molecular weight, within the range of about 200 to about 30,000 can be prepared. Furthermore, the substantially liquid polydiolefins can be prepared in yields amounting to many moles of polymer per mole of organometal catalyst in contrast to the maximum yield, i.e., about one mole of polymer per mole of organometal catalyst, obtainable from the "living polymer" reaction with the organolithium catalysts previously known to the art.

The ratio of 1,2 structure in both liquid and solid polymeric products depends in general upon the amount of chelating bifunctional Lewis base utilized in the process. Thus, 60 to 90% of 1,2 structure and even higher or lower amounts can be obtained if desired. This gives a useful flexibility to the process.

In practicing a further embodiment of this invention, the catalyst is prepared by mixing the catalyst components, i.e., the organolithium or organomagnesium compound and the bifunctional Lewis base, as described hereinabove. The resultant catalyst mixture is then allowed to age for a period of about 10 minutes to several months or longer, preferably 1 to 60 days, prior to its use in the polymerization reaction. If desired, the aging of the catalyst may be hastened by heating the catalyst mixture at about 30 to 100° C., preferably 40 to 80° C., for about 1 minute to 10 days.

During the aging reaction, the monovalent hydrocarbon radicals, i.e., the organic moieties of the organolithium or organomagnesium components, are converted to their corresponding hydrocarbons. For example, if n-butyllithium is mixed with a bifunctional Lewis base and the mixture allowed to age, the n-butyl radical of n-butyllithium is converted to n-butane; in a similar manner, the use of di-n-propylmagnesium in the aging reaction would result in the formation of n-propane, the use of cyclohexyllithium in the aging reaction would result in the formation of cyclohexane, the use of phenyllithium in the aging reaction would result in the formation of benzene, etc. Of course, the degree of conversion of the monovalent hydrocarbon radical to its corresponding hydrocarbon depends upon the aging period (unless the aging period is hastened by heating, in which case the aging temperature would also be a relevant factor).

As the monovalent hydrocarbon radical is being converted to its corresponding hydrocarbon, the metallic moiety of the organometal, i.e., the lithium or magnesium atom, in turn becomes attached to the bifunctional Lewis base, thus resulting in a new nitrogen-containing organolithium or organomagnesium catalyst of unknown structure. It has been discovered that if ethylene is polymerized in the presence of this new catalyst of unknown structure, the basic nitrogen content and Harris molecular weight of the resultant polyethylene rises according to the "age" of the catalyst, i.e., the percentage of this new catalyst of unknown structure present in the total catalyst mixture.

When preparing and utilizing the aged catalysts of this invention, the aging period and temperature should be such that at least about 1% preferably more than 10%, of the monovalent hydrocarbon radicals of the organolithium or organomagnesium catalyst components have been converted to their corresponding hydrocarbons.

The polyethylene prepared with the catalysts of this invention has a high degree of linearity and a Harris molecular weight in the range of about 40,000 to 1,000,000 or higher depending primarily upon the age of the catalyst and, to some extent, the polymerization temperature and initial ethylene pressure. Because of the linearity, the polyethylene is highly crystalline and has a density in the range of about 0.94 and 0.98 depending upon the molecular weight and extent of annealing. Generally, the density is greater than 0.95, i.e. at least 0.96. In addition, when ethylene is polymerized with the catalysts of this invention, the resultant polyethylene contains sufficient amounts, i.e. about 0.01 to 1.0% by weight of the polyethylene, of basic nitrogen bound in the polymeric chain so as to allow the polyethylene to be dyed with various commercially available dyes.

This invention and its advantages will be better understood by reference to the following examples:

Example 1

To 100 ml. n-heptane was added 0.13 g. (0.002 mole) of n-butyllithium and 0.23 g (0.002 mole) N,N,N',N'-tetramethyl-1,2-ethanediamine. This solution was then placed in a 300 ml. Aminco bomb and the bomb was sealed. All of these operations were carried out in a glove box under a dry nitrogen atmosphere.

The sealed bomb was placed in a heated shaker and connected to an ethylene source without exposure to air. Ethylene at 2,000 p.s.i.g. was pressured into the bomb while the bomb was being shaken. The bomb was then heated to 40° C. and allowed to rock for 4 hours. The heat source was turned off at the end of the 4 hour period and the bomb allowed to cool, while rocking, to room temperature.

The product was isolated by mixing the contents of the bomb with 500 ml. isopropyl alcohol containing 5 ml. acetyl acetone and 5 ml. concentrated hydrochloric acid. The slurry was boiled for 5 minutes, filtered hot and washed with fresh isopropyl alcohol. The polymer was then rinsed with acetone containing 0.08% 2,6-di-tert.-butyl-p-cresol and vacuum dried at 80° C. for 12 hours.

The polymer properties were determined using standardized procedures well known to the art. Solution viscosity was measured in decalin at 135° C. using concentrations of 0.1 to 1.0 g./l. The molecular weight was calculated from the relationship of I. Harris [I. Harris, J. Polymer Science 8, 361 (1952)]. Changes in catalyst composition and polymerization conditions are given in Table I for control Runs B and C. Except as noted in Table I, all procedures are identical to those described hereinabove for Run A. The best literature data available (columns D, E, F and G) are included for comparison.

TABLE I.—ETHYLENE POLYMERIZATION WITH ALKYLLITHIUM CATALYSTS

| Run | A | B | C | D[1] | E[2] | F[2] | G[2] |
|---|---|---|---|---|---|---|---|
| Lithium compound | n-Butyl | n-Butyl | n-Butyl | n-Propyl | n-Butyl | n-Butyl | Phenyl |
| Amount in grams | 0.13 | 0.13 | 0.26 | 125 | 4.3 | 0.4 | 10 |
| Cocatalyst | TMEDA[3] | None | None | None | None | None | None |
| Amount in grams | 0.23 | | | | | | |
| Diluent | n-Heptane | n-Heptane | n-Heptane | Diethyl ether | Benzene | i-Octane | Diethyl ether |
| Amount in milliliters | 100 | 100 | 100 | 600 | 100 | 250 | 150 |
| Ethylene pressure, p.s.i.g.: | | | | | | | |
| Maximum | 2,750 | 3,000 | 810 | 4,900 | 14,300 | 14,600 | 14,000 |
| Minimum | 2,500 | 2,500 | 500 | 300 | 13,300 | 11,100 | 5,950 |
| Reaction temp., ° C | 40–42 | 25 | 25–100 | −20 to 53 | 20–26 | 98–100 | 56–73 |
| Reaction time, hours | 4 | 19 | 3.5 | 2.5 | 17 | 17.8 | 16.5 |
| Yield of polymer, grams | 5.5 | 0 | 0.13 | ([5]) | 4.5 | 30 | 100 |
| Rate of polymer formation, g./hr./g. lithium compound | 10.6 | 0 | 0.14 | 0.75 | 0.062 | 4.2 | 0.61 |
| Polymer Properties: | | | | | | | |
| Inherent viscosity dl./g | 1.23 | | ([4]) | ([5]) | 0.63 | ([6]) | 0.23 |
| Harris molecular wt. ×10⁻³ | 52 | | ([4]) | ([5]) | 18 | ([6]) | 3.7 |

[1] As disclosed by Ziegler, Ann. 567 195 (1950).
[2] As disclosed by Hanford, U.S. Patent No. 2,377,779.
[3] TMEDA is N,N,N',N'-tetramethyl-1,2-ethanediamine.
[4] The product was a soft wax with a moleculor weight less than 2000.
[5] Only liquid products (236 g. of $C_6$ to $C_{14}$ alcohols) were obtained by adding paraformaldehyde to the reaction products.
[6] Not disclosed by Hanford in U.S. Patent No. 2,377,779.

An inspection of the results disclosed in Runs A, B and C, Table I, indicates the dramatic increase in inherent viscosity (and correspondingly, the increase in molecular weight) which was achieved when the bifunctional Lewis base, N,N,N',N'-tetramethyl-1,2-ethanediamine, was utilized as a cocatalyst (Run A). In addition, high molecular weight polyethylene was obtained with relatively low ethylene pressures and short residence times. By comparison, the Ziegler (Run D) and Hanford processes (Runs E, F and G) failed to produce high molecular weight polyethylene even at extremely high ethylene pressures, thus exhibiting the marked process improvement which results when the bifunctional Lewis base is used as a cocatalyst.

Example 2

Following the procedures as set forth in Example 1, ethylene was polymerized with catalyst systems which consisted of n-butyllithium and various monofunctional Lewis bases. The monofunctional Lewis bases which were employed in this example were those compounds which were known in the art as effective cocatalysts for increasing the catalytic activity of n-butyllithium in the polymerization of butadiene-1,3, styrene and polar monomers. The changes in catalyst composition and polymerization conditions are given in Table II for Runs A, H, I, J, K, L and M. Run A, which is identical to Run A in Example 1, is repeated in Table II as a control for comparative purposes.

TABLE II.—ETHYLENE POLYMERIZATION WITH MONOFUNCTIONAL LEWIS BASES AS COCATALYSTS

| Run | A | H | I | J | K | L | M |
|---|---|---|---|---|---|---|---|
| Catalyst | (1) | (1) | (1) | (1) | (1) | (1) | (1) |
| Amount in grams | 0.13 | 0.26 | 0.26 | 0.13 | 0.26 | 0.13 | 0.13 |
| Cocatalyst | TMEDA[2] | (3) | (3) | $(C_6H_5)_3P$ | $(CH_3)_3NO$ | $(C_2H_5)_3N$ | $[(CH_3)_2N]_3PO$ |
| Amount in grams | 0.23 | 8.87 | 0.58 | 1.05 | 0.30 | 0.40 | 0.36 |
| Millimoles Catalyst/Cocatalyst | 2/2 | 4/123 | 4/8 | 2/4 | 4/4 | 2/4 | 2/2 |
| Diluent | (4) | (4) | (4) | (4) | (5) | (4) | (4) |
| Amount in milliliters | 100 | 90 | 100 | 100 | 100 | 100 | 100 |
| Ethylene pressure, p.s.i.g | 2,000 | 1,075 | 640 | 1,100 | 1,400 | 2,600 | 1,200 |
| Reaction temperature, °C | 40-42 | 25-150 | 100 | 70 | 50-100 | 40 | 70-100 |
| Reaction time, hours | 4 | 2.67 | 2 | 4 | 5 | 4 | 5 |
| Polyethylene Properties: | | | | | | | |
| Yield, grams | 5.5 | 0.06 | 0 | 0 | 0 | 0 | 0 |
| Inherent viscosity, dl./g | 1.23 | | | | | | |
| Harris molecular wt. $\times 10^{-3}$ | 52 | | | | | | |

[1] n-Butyllithium.
[2] TMEDA is N,N,N',N'-tetramethyl-1,2-ethanediamine.
[3] Tetrahydrofuran.
[4] n-Heptane.
[5] Benzene.

Runs H and I indicate that only a trace of low molecular weight wax was obtained with tetrahydrofuran, although tetrahydrofuran has been reported as a very effective cocatalyst for the polymerizaton of butadiene-1,3 or styrene, A. A. Korotkov, Pre-Prints of Papers, Intern. Symp. on Macromol. Chem., Prague (1957), Paper No. 66 and I. Kuntz, J. Polymer Sci., 54, 583 (1961). Runs J, K, L and M indicate that no polyethylene was obtained when triphenylphosphine, trimethylamine oxide, triethylamine or hexamethylphosphoramide were employed as cocatalysts. A comparison of Runs A and L is particularly significant since TMEDA (Run A) and triethylamine (Run L) are structurally related in that both compounds contain a tertiary amino group. In both TMEDA (Run A) and triethylamine (Run L) there were two available tertiary amino groups per mole of butyllithium inasmuch as the molar ratio of TMEDA to n-butyllithium was 1 to 1 and the molar ratio of triethylamine to n-butyllithium was 2 to 1. In view of the structural similarity between TMEDA and triethylamine, one might expect that both compounds would be effective cocatalysts for the polymerization of ethylene. However, the data in Run L indicates that no polyethylene was obtained with triethylamine although the initial ethylene pressure was higher in Run L than in Run A.

Example 3

Polymerization catalysts were prepared by mixing various amounts of n-butyllithium and TMEDA in n-heptane. These catalysts were then aged at various temperatures for various periods of time and were employed in the polymerization of ethylene using the procedure set forth in Example 1. Changes in catalyst concentration, aging temperature and aging time are given in Table III.

The length of time that the catalyst components, premixed and dissolved in an inert diluent, of the type described above, are allowed to stand prior to their use in the polymerization reaction is defined herein as the "age" of the catalyst. Runs C to I in Table III indicate that if ethylene is polymerized with catalysts of different ages, the molecular weight of the resultant polyethylene rises correspondingly with the increasing age of the catalyst. Run B in Table III indicats that the aging of the catalyst may be hastened by heating. Run A in Table III indicates that the reactions involved in the aging process are also somewhat dependent upon the concentration of each component in the diluent. Thus, by varying the age of the catalysts of this invention and utilizing the aged catalysts in the polymerization of ethylene, polyethylene of any pre-selected molecular weight ranging from fast-processing injection molding grades to tough, high impact grades may be prepared.

Example 4

Following the procedure set forth in Example 3, ethylene was polymerized with several aged catalysts. The changes in catalyst composition, catalyst aging and polymer properties are shown in Table IV.

TABLE IV.—CATALYST AGING EXPERIMENTS
[n-Heptane diluent, 2,500 p.s.i.g. ethylene, 40° C., 4 hours reaction time]

| Run | D | J | K |
|---|---|---|---|
| n-Butyllithium, mmoles | 4 | 4 | 4 |
| Cocatalyst | TMEDA | $(CH_3)_3N$ | $(CH_3)_2O$ |
| Mmoles | 4 | 4 | 4 |
| Catalyst Aging: | | | |
| Temp., °C | 25 | 25 | 25 |
| Time, hours | 24 | 192 | 120 |
| Catalyst Efficiency: g. polyethylene/g. n-butyllithium | 42.3 | Trace | 0 |
| Polyethylene, Harris Mol. Wt. $\times 10^{-3}$ | 36 | <2 | |

Table IV indicates the effect of aging upon several cocatalysts and the resultant polyethylene obtained from the polymerization of ethylene in the presence of these cocatalysts. A comparison of Runs D, J and K indicate that while a bifunctional Lewis base such as TMEDA exhibits improved catalytic activity when aged with n-butyllithium for 24 hours prior to the polymerization reaction, aging has little or no effect upon such monofunctional Lewis bases as trimethylamine (Run J) and dimethylether (Run K). Thus, ageing does not improve the catalyst when monofunctional Lewis bases are used as the cocatalyst rather than the bifunctional Lewis bases of this invention.

TABLE III.—THE EFFECT OF CATALYST AGING UPON THE MOLECULAR WEIGHT OF POLYETHYLENE

| Run | A | B | C | D | E | F | G | H | I |
|---|---|---|---|---|---|---|---|---|---|
| n-Butyllithium, mmoles | 8 | 4 | 2 | 2 | 2 | 2 | 2 | 2 | 2 |
| TMEDA, mmoles | 4 | 2 | 2 | 2 | 2 | 2 | 2 | 2 | 2 |
| Catalyst Aging: | | | | | | | | | |
| Temp., °C | 25 | 90 | 25 | 25 | 25 | 25 | 25 | 25 | 25 |
| Time, hours | 1 | 0.25 | 2 | 24 | 2 | 24 | 144 | 960 | 1,224 |
| Concentration, g./l. of n-heptane | 66 | 213 | 3.6 | 3.6 | 169 | 65 | 65 | 231 | 186 |
| Polymerization Temp., °C | 40 | 40 | 40 | 40 | 40 | 40 | 27 | 30-43 | 27 |
| Ethylene, p.s.i.g | 2,500 | 2,500 | 2,500 | 2,500 | 3,000 | 3,000 | 3,000 | 4,500 | 4,000 |
| Polyethylene, Harris Mol. Wt. $\times 10^{-3}$ | 10 | 34 | 29 | 36 | 45 | 55 | 72 | 165 | 300 |

Example 5

Following the procedure set forth in Example 1, ethylene was polymerized with several catalyst systems comprising n-butyllithium and, as cacatalysts, N,N,N',N'-tetramethylmethanediamine, N,N,N',N'-tetramethyl-1,3-propanediamine, N,N,N',N'-tetramethyl - 1,4 - butanediamine, and N,N,N',N'-tetramethyl-1,5-hexanediamine. Increased catalytic activity and polyethylene molecular weight were obtained when butyllithium was activated by these cocatalysts with the exception of N,N,N',N'-tetramethyl-1,5-hexanediamine.

When N,N,N',N'-tetramethylmethanediamine was utilized as the cocatalyst, 1.2 grams of solid polyethylene was obtained from the polymerization reaction; 3.6 grams of solid polyethylene was obtained when N,N,N',N'-tetramethyl-1,3-propanediamine was employed as the cocatalyst; 0.3 gram of solid polyethylene was obtained when N,N,N',N'-tetramethyl-1,4-butanediamine was employed as the cocatalyst; when N,N,N',N'-tetramethyl-1,5-hexanediamine was employed as the cocatalyst, only a trace of very low molecular weight polyethylene was obtained. These results, similar to those obtained with monofunctional Lewis bases (Example 2), indicate that N,N,N',N'-tetramethyl-1,5-hexanediamine did not form the same catalyst as the other diamines. Since it is well known that bifunctional complexing agents containing 3 to 6 atoms (including the functional groups) tend to form cyclic complexes whereas those which contain more than 6 atoms form open chain polymeric complexes, these results indicate that the catalysts of this invention are cyclic complexes (i.e., chelates) containing 4 to 7 carbon atoms in the rings which have formed between the bifunctional Lewis base and the organometal.

Example 6

Following the procedure set forth in Example 1, ethylene was polymerized with catalyst systems comprising n-butyllithium as the catalyst and, as the cocatalysts, various bifunctional Lewis bases. The cocatalysts and polymerization results are summarized in Table V.

TABLE V.—ETHYLENE POLYMERIZATIONS WITH VARIOUS COCATALYSTS

[n-Butyllithium catalyst, n-heptane diluent, 40° C. reaction temp., 4 hours reaction time]

| Run | Solid Polyethylene |
|---|---|
| 1. 1,2-dipiperidino-ethane | Yes. |
| 2. N,N,N'-tetramethyl-N'-ethyl-1,2-ethanediamine | Yes. |
| 3. N,N'-dimethyl-N',N'diethyl-1,2-ethanediamine | Yes. |
| 4. N,N,N',N'-tetramethyl-1,3-butanediamine | Yes. |
| 5. N,N,N',N'-tetramethyl-butylphosphonamidite | Yes. |
| 6. N,N,N',N'-tetramethyl-o-phenylenediamine | Yes. |
| 7. 2,2'-bipyridine | No. |
| 8. N-methyl-tetraethyldiethylenetriamine | No. |
| 9. 1,2-dimethoxyethane | No.[1] |
| 10. Acetone dimethylacetal | No. |

[1] Only small amounts of low molecular weight (<2000) wax was obtained in four experiments.

The data in Table V (Runs 1 to 6) indicate that di-tertiary amines in general are effective cocatalysts and that considerable variation in their structure is permissible within the limitation that the amino groups be separated by no more than 4 atoms or methylenic groups as illustrated in Example 5. The negative results in Table V (Runs 7 to 10) are particularly significant in that they illustrate the rather strict requirements of this catalyst system. Run 7 shows that the weakly basic 2,2'-bipyridine is ineffective although this compound is well known in the art as having the capacity to form bidentate complexes with transition metal compounds. Run 8 shows that a tri-tertiary amine is inactive (it has been shown in previous examples that monofunctional tertiary amines are inactive). Run 9 indicates that the di-ether, 1,2-dimethoxy ethane, possesses only trace activity resulting in the production of low molecular weight polyethylene. This di-ether is quite similar in structure to the active di-tertiary amines, indicating that bifunctional oxygen bases are not suitable cocatalysts. Thus, only one of the two nitrogenous basic groups may be replaced by a different basic group even in the most favorable bidentate structures.

Example 7

Following the procedure set forth in Example 6, the organic moiety of the organometal catalyst was studied using TMEDA as the cocatalyst. n-Butyllithium was replaced by phenyllithium and by sec.-butyllithium. In both cases the catalytic activity was good and high molecular weight polyethylene was obtained Thus, there does not appear to be any limitation as to the organic moiety of the organometal catalyst.

Example 8

Ethylene was polymerized with a catalyst comprising 3 mmoles di-n-butylmagnesium (0.415 g.) complexed with 3 mmoles TMEDA (0.348 g.) in 100 ml. heptane diluent at 700 p.s.i.g. and 100° C. for 3 hours. Following the procedure set forth in Example 1, 9.6 grams of solid polyethylene was obtained per gram of di-n-butylmagnesium.

By contrast, when the di-n-butylmagnesium was replaced by ethylmagnesium chloride, diethyl zinc or triethyl aluminum, no solid polyethylene was obtained. Thus, the structural and electronic requirements for the polymerization of ethylene with base-activated organometals limit the choice of the metallic moiety of the organometal to either lithium or magnesium.

Example 9

Large-scale experiments were carried out in order to obtain sufficient amounts of polyethylene for a detailed evaluation of the physical properties of polyethylene which is produced by the polymerization of ethylene with the catalysts of this invention. Two solutions of n-butyllithium-TMEDA complex in n-hexane (1.28 molar) were aged at 25° C. for 6 and 40 days respectively. The aged catalysts were then charged into 1.4 liters Aminco bombs, containing 600 ml. n-heptane. Ethylene at 3,000 and 4,000 p.s.i.g. respectively was charged into the bombs at room temperature and, upon completion of the polymerization reaction, the polyethylene was isolated using the procedure set forth in Example 1. Table VI, indicates the catalysts, polymerization conditions, and the polymer properties.

TABLE VI

| Experiment | A | B |
|---|---|---|
| Catalyst: | | |
| n-Butyllithium, mmoles | 10 | 10 |
| TMEDA, mmoles | 10 | 10 |
| Age, days | 6 | 40 |
| Polymerization: | | |
| Ethylene, p.s.i.g | 3,000 | 4,000 |
| Temp., 0° C | 30 | 38 |
| Time, hours | 5 | 6 |
| Polyethylene, yield in grams | 32.3 | 34.8 |
| Catalyst efficiency, g. polyethylene/g. n-butyllithium | 51 | 54 |
| Polyethylene Properties: | | |
| Inherent viscosity in decalin at 135° C., dl./g | 1.30 | 2.54 |
| Harris Mol. Wt.×10$^{-3}$ | 56 | 165 |
| Density | 0.9720 | 0.9745 |
| Tensile Strength, p.s.i. at 2"/min | 4,230 | 4,560 |

The data in Table VI indicate that the values of the density and tensile strength of the polyethylenes prepared in Example 9 are higher, at their indicated molecular weights, than those of the most linear polyethylenes known to the art.

Example 10

Aging the n-butyllithium TMEDA catalyst mixture was found to result in quantitative evolution of butane which arose from the abstraction of hydrogen from the TMEDA by the n-butyllithium. Thus, as a result of the aging reaction, a new organolithium compound of uncertain structure was formed in which the organic moiety comprised all or part of the TMEDA. Infrared and nuclear magnetic resonance studies of this new organolithium compound indicate that it may have the structure

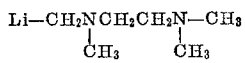

When ethylene polymerization was initiated with this new organometal, the diamine moiety became attached to the polymer chain such that the polymer chain contained bound nitrogen. In addition to the terminal nitrogen-containing group, it would be possible for other TMEDA groups to be incorporated into the polymer chain by chain transfer reactions with other TMEDA molecules during the polymerization such that the polymer would contain large amounts of bound nitrogen. For example, up to 1% or higher of bound nitrogen, by weight of the polymer, can be introduced by varying aging conditions, diamine/lithium ratio, etc.

Ethylene was polymerized with aged catalysts using the procedure set forth in Example 3. The ages of the catalysts and the corresponding amounts of nitrogen incorporated in the resultant polyethylene are shown in Table VII.

TABLE VII.—EFFECT OF CATALYST AGE UPON NITROGEN CONTENT OF POLYETHYLENE

| n-Butyllithium TMEDA catalyst age: | Weight percent nitrogen bound in the polyethylene |
|---|---|
| 2 hours | 0.095 |
| 4 days | 0.21 |
| 8 days | 0.44 |

All of the polymers in Table VII were isolated using the procedure set forth in Example 1, using isopropanol, pentanedione and hydrochloric acid to extract catalyst residues and any unreacted diamine. In order to clearly demonstrate that the nitrogen was bound within the polymer chain, the polyethylene samples in Table VII were extracted with various solvents and acids. Upon completion of the extraction experiments, it was found that the nitrogen content of the polyethylene samples remained substantially constant. Thus, polymers prepared with the catalysts of this invention, are unlike any of the known polyethylenes or polyethylene copolymers but, instead, possess novel structures.

Example 11

One of the attractive features of a polyolefin which contains bound hetero-atoms is its ability to accept dyes. Polyolefins ordinarily contain no functional groups and must therefore be subjected to post-polymerization treatments such as grafting, sulfonation, peroxidation, and the like in order to render them dyeable.

The polymers prepared with the catalysts of this invention contain sufficient amounts of bound nitrogen such that the polymers are dyeable. Film samples were pressed from the polymer described in Run B of Table VI. Kjeldahl analysis indicated that these film samples contained 0.35 wt. percent nitrogen. The film samples were dyed simultaneously with control films of polyethylene which had been prepared by utilizing an aluminum triethyl-titanium trichloride catalyst. The dyes utilized in this experiment were Anthraquinone Rubine R and Alizarine Cyanine Green GHN. Inspection of the dyed polymer films indicated that the polymers of this invention dyed to deep colors whereas the control films showed only a faint tint.

Example 12

To 50 ml. of n-heptane was added 0.26 g. (4 mmoles) of n-butyllithium and 0.46 g. (4 mmoles) of N,N,N',N'-tetramethyl-1,2-ethanediamine (TMEDA). The catalyst solution was then added, with stirring, to a solution of 54 g. butadiene-1,3 in 360 ml. of n-heptane at 10° C. The temperature rose in 8 minutes to 25° C. and the reaction was maintained at this temperature for 1 hour.

The reaction was terminated by the addition of 5 ml. of isopropyl alcohol and the product was isolated by adding 2 l. of isopropyl alcohol to the reaction mixture and decanting the liquid from the precipitated polymer. The polymer was then washed with fresh, hot isopropyl alcohol containing 0.08% 2,6-di-tert.-butyl-p-cresol and vacuum dried for 6 hours at 60° C. The structure of the polymer was determined by infrared analysis using the Hampton procedure [R. R. Hampton, Anal. Chem., 21, 923 (1949)] with 0.5 to 1 wt. percent solutions of the polymer in carbon disulfide. Changes in catalyst composition, polymerization conditions and polymer properties are given in Table VIII for Runs B, C, D and E; except as indicated in Table VIII, all procedures are identical as described hereinabove for Run A.

TABLE VIII.—BUTADIENE-1,3 POLYMERIZATION IN n-HEPTANE

| Run | A | B | C | D | E |
|---|---|---|---|---|---|
| n-Butyllithium, grams | 0.26 | 0.13 | 0.13 | 0.26 | 0.092 |
| Cocatalyst | TMEDA [1] | TMEDA | DME [6] | THF [2] | None |
| Grams | 0.46 | 0.23 | 0.18 | 46 | |
| n-Heptane, ml | 410 | 410 | 410 | 300 | 300 |
| Butadiene-1,3, g | 54 | 54 | 54 | 57 | 55 |
| Initial Reaction Temperature, °C | 10 | −20 | 10 | 11 | 23 |
| Final Reaction Temperature, °C | 25 | 25 | 25 | 11 | 23 |
| Reaction Time, Hours | 1 | 18 | 1 | 5 | 19 |
| Butadiene-1,3 Conversion, percent | 92 | 100 | 1.4 | 33 | 60 |
| Catalyst Efficiency, g. polymer/g. n-butyllithium | 190 | 419 | 6 | 73 | 358 |
| Polymer Inherent Viscosity, dl./g.[3] | 0.548 | 1.11 | | 0.93 | 2.5 |
| Polymer, Molecular Weight×10⁻³[4] | 11.7 | 70 | | 47 | 440 |
| Moles of Polymer/Mole of n-butyllithium [5] | 2.1 | 0.77 | | 0.2 | 0.10 |
| Polymer Structure: | | | | | |
| Percent 1,2 | 87.5 | 89 | | 95 | 9 |
| Percent 1,4-trans | 12.5 | 11 | | | 46 |
| Percent 1,4-cis | 0 | 0 | | | 45 |

[1] N,N,N',N'-tetramethyl-1,2-ethanediamine.
[2] Tetrahydrofuran.
[3] Measured in toluene at 23° C.
[4] Johnson relationship for emulsion polybutadiene; Ind. Eng. Chem. 41, 1,580 (1949).
[5] Assuming viscosity average mol. wt./number average mol. wt.=2.
[6] 1,2-dimethoxyethane.

A comparison of Runs A and B with Run E indicates that the presence of a nitrogen-containing chelating bifunctional Lewis base, i.e., N,N,N',N'-tetramethyl-1,2-ethanediamine, even at very low concentrations, changed the stereochemistry of polymer to predominantly 1,2 structure. Although a polymer with a high 1,2 structure was obtained when tetrahydrofuran was utilized as a cocatalyst in solvent quality (Run D), the catalyst efficiency of the tetrahydrofuran was only ⅓ of that obtained when N,N,N',N'-tetramethyl-1,2-ethanediamine was utilized as the cocatalyst (Run A); furthermore, comparatively high values of 1,2 structure in the polymers were obtained in Runs A and B although only catalytic amounts of cocatalyst were used. When the analogous chelating di-ether, dimethoxyethane, was used in place of the diamine, the catalyst was essentially inactive (Run C), indicating the criticality of the cocatalyst structure.

Example 13

To 30 ml. n-heptane was aded 0.14 g. (1 mmole) of di-n-butylmagnesium and 0.12 g. (1 mmole) of N,N,N',N'-tetramethyl-1,2-ethanediamine. Butadiene-1,3 was bubbled through this solution for 15 minutes at a temperature in the range of 20° to 50° C.; at the end of this time a yield of 1 g. of a semi-solid polymer was obtained. Infrared analysis showed that the polymer had the following structure: 84.7% 1,2-units, 15.3% trans-1,4 units and no cis-1,4 units. Since alkyl magnesium compounds are normally inactive for polymerizing butadiene-1,3, even in the presence of ethers, this result indicates that the cocatalysts of this invention are highly effective activators for organomagnesium compounds as well as organolithium compounds.

Example 14

To 50 ml. of benzene was added 0.13 g. (2 mmoles) of n-butyllithium and 0.23 g. (2 mmoles) of N,N,N',N'-tetramethyl-1,2-ethanediamine. The catalyst solution was allowed to stand for 15 minutes and was then added at reaction temperature, with stirring, to 320 ml. of benzene and 50 g. of butadiene-1,3 (the latter solution had been previously dried over calcium hydride). The reaction mixture was stirred at a constant temperature for 2 hours and the reaction was then terminated by the addition of 5 ml. of methanol; the polymer was then precipitated by the addition of 1600 ml. of methanol to the reaction mixture. The liquid layer was decanted from the gummy solids and the solids were then washed with fresh hot methanol containing 0.08% 2,6-di-tert.-butyl-p-cresol and vacuum dried for 6 hours at 40° to 60° C. Examination of the liquid layer indicated the presence of considerable amounts of low molecular weight soluble polymer.

Changes in catalyst composition, polymerization conditions and polymer properties are shown in Table IX. Except as noted in Table IX, all procedures are identical with that described hereinabove for Run F.

The low viscosity average molecular weights in Runs F, G, and H compared with those obtained in Runs A and B (Table VIII) indicate that the benzene diluent terminated the polymeric chain of the polymers by acting as a chain transfer agent. Thus, as in Run F, wherein 7.5 moles of polymer/mole of n-butyllithium were obtained, one can prepare low viscosity average molecular weight polydiolefins using the catalysts of this invention under conditions of chain transfer so as to obtain more than one mole of polymer per mole of organolithium catalyst. When conventional lithium catalysts are employed, only "living polymers" are obtained and thus a maximum of only one mole of polymer can be produced per mole of lithium catalyst. The use of a lithium catalyst in the "living polymer" reaction to prepare low molecular weight polymers is uneconomical in view of the high cost of the catalyst and the process of this invention now makes the synthesis of low molecular weight polydiolefins economically attractive.

Run I indicates that N,N,N',N'-tetramethyl-1,6-hexanediamine is a rather poor catalyst, presumably because of its relative inability to form bidentate chelate complexes with the lithium alkyl. In contradistinction, N,N,N',N'-tetramethyl-1,3-propanediamine (Run J) exhibited an activating effect similar to that of N,N,N',N'-tetramethyl-1,2-ethanediamine employed in Runs F, G and H. In general, chelating agents which lead to the formation of ring complexes having 4 to 7 members are the most effective cocatalysts. Thus, since N,N,N',N'-tetramethyl-1,6-hexanediamine would have to form a nine-membered ring, which is highly unlikely, its effectiveness as a cocatalyst is greatly diminished.

Example 15

To 50 ml. of toluene was added 0.13 g. (2 mmoles) of n-butyllithium and 0.116 g. (1 mmole) of N,N,N',N'-tetramethyl-1,2-ethanediamine. This solution was then added, with stirring, to a solution of 108 g. of butadiene-1,3 in 300 ml. of toluene at 10 C. The temperature was then raised to 25° C. in 11 minutes and the reaction was maintained at 25° C. for 25 hours.

The reaction mixture was washed with 100 ml. of water to remove catalyst residues and the phases were separated. The resultant toluene solution contained 26 wt. percent polymer which could be utilized as is or concentrated to a higher solids content. Changes in catalyst composition, polymerization conditions and polymer properties are shown in Table X. Except as noted in Table X, all procedures are identical with that described hereinabove for Run K.

Since the butadiene-1,3 conversion in Run K was nearly 100%, it is evident that one need only adjust the monomer and catalyst concentrations to obtain 1,2-polydiolefins with a particular viscosity average molecular weight and a particular concentration in a hydrocarbon vehicle without any additional processing. This invention thus offers great process economies over conventional processes (those processes utilizing organolithium catalysts in expensive solvents, e.g. ether, tetrahydrofuran, or sodium catalysts in dioxane and the like) for preparing polybutadiene with a high 1,2 structure by eliminating the need for recovery and handling of polymer solids, diluent recovery and recycle, dissolution of the polymer

TABLE X

| Run | K | L | M |
| --- | --- | --- | --- |
| n-Butyllithium, grams | 0.13 | 0.13 | 0.26 |
| Cocatalyst | (1) | (1) | (1) |
| Grams | 0.116 | 0.136 | 46 |
| Diluent | (5) | (5) | (6) |
| Milliliters | 350 | 350 | 350 |
| Butadiene-1,3, grams | 108 | 108 | 57 |
| Reaction Temperature, °C | 25 | 20 | 11 |
| Reaction Time, hours | 2.5 | 2 | 5 |
| Butadiene-1,3 Conversion, percent | 99 | 4.6 | 33 |
| Catalyst Efficiency, g. polymer/g. n-butyllithium | 819 | 38 | 73 |
| Polymer Inherent Viscosity, dl./g.[2] | 1.01 | 0.14 | 0.93 |
| Polymer Structure [3]: | | | |
| Percent 1,2 | 76 | 46 | 95 |
| Percent 1,4-trans | 10 | 33 | |
| Percent 1,4-cis | 14 | 21 | |

[1] TMEDA=N,N,N',N'-tetramethyl-1,2-ethanediamine.
[2] Measured in toluene at 23° C.
[3] Determined by the Hampton procedure; Anal. Chem., 21, 923 (1949).
[4] Tetrahydrofuran.
[5] Toluene.
[6] n-Heptane.

TABLE IX.—BUTADIENE-1,3 POLYMERIZATION IN BENZENE

| Run | F | G | H | I | J |
| --- | --- | --- | --- | --- | --- |
| n-Butyllithium, grams | 0.13 | 0.13 | 0.13 | 0.13 | 0.13 |
| Cocatalyst | TMEDA [1] | TMEDA [1] | TMEDA [1] | TMHDA [2] | TMPDA [3] |
| Grams | 0.23 | 0.23 | 0.23 | 0.342 | 0.26 |
| Benzene, ml | 370 | 370 | 370 | 370 | 370 |
| Butadiene-1,3, grams | 50 | 50 | 50 | 50 | 50 |
| Reaction Temp., °C | 10 | 25 | 40 | 25 | 25 |
| Reaction Time, hours | 2 | 2 | 2 | 2 | 2 |
| Yield of Polymer, grams | 22.4 | 24.5 | 25.6 | 5.9 | 20.5 |
| Catalyst Efficiency, g. polymer/g. n-butyllithium | 172 | 188 | 197 | 45 | 158 |
| Polymer Inherent Viscosity, dl./g.[4] | 0.303 | 0.334 | 0.368 | 0.230 | 0.323 |
| Polymer Molecular Weight×10⁻³ [5] | 3.0 | 3.7 | 4.7 | 1.5 | 3.4 |
| Moles of Polymer/Mole of n-butyllithium [6] | 7.5 | 6.6 | 5.4 | 3.9 | 6.0 |

[1] N,N,N',N'-tetramethyl-1,2-ethanediamine.
[2] N,N,N',N'-tetramethyl-1,6-hexanediamine.
[3] N,N,N',N'-tetramethyl-1,3-propanediamine.
[4] Measured in toluene at 23° C.
[5] Molecular weights were determined by the Johnson Relationship for emulsion polybutadiene; Ind. Eng. Chem. 41, 1, 580 (1949).
[6] Assuming viscosity average mol. wt./number average mol. wt.=2.

in another diluent, etc. The process of this invention is especially attractive for the preparation of low molecular weight polydiolefins which are normally marketed as hydrocarbon solutions.

A comparison of the results of Run K with that of Runs L and M, as shown in Table X, indicates that when a catalytic amount of tetrahydrofuran was employed as a cocatalyst (Run L), the catalytic activity and resultant polybutadiene viscosity average molecular weight were extremely low; furthermore, the polymer in Run L contained only 46% 1,2 structure as compared with 76% 1,2 structure obtained in Run K. The attractiveness of the chelating bifunctional Lewis base in Run K over the monofunctional Lewis base in Run L is even more striking when it is realized that only one mole of TMEDA per two moles of n-butyllithium was employed in Run K whereas the molar ratio of tetrahydrofuran to n-butyllithium in Run L was 1:1.

In Run M, the desired degree of 1,2 structure was present but the catalytic activity of the tetrahydrofuran was less than one-tenth of that exhibited by TMEDA in Run K and as a result of the large quantity of tetrahydrofuran employed in Run M, processing difficulties such as recovery of the cocatalyst, redissolution of the polymer in another diluent, etc., would be expected in a process which employed tetrahydrofuran rather than TMEDA as the cocatalyst.

Example 16

To 5 ml. of n-heptane was added 0.046 g. (1 mmole) of n-butyllithium and 0.116 g. (1 mmole) of N,N,N',N'-tetramethyl-1,2-ethanediamine. Eighty-one grams of liquid butadiene-1,3 which had been previously dried over calcium hydride was introduced into a reactor fitted with a Dry Ice reflux condenser. The catalyst solution was added to the reactor at −10° C. and the reaction mixture was stirred for one hour at a temperature ranging between −10° and 0° C. Upon precipitation of the polymer by the addition of methyl alcohol containing 0.08% 2,6-di-tert.-butyl-p-cresol to the reaction mixture and subsequent vacuum drying for 6 hours at 60° C., 51 g. (63% conversion) of polymer was obtained. The rate of polymerization was found to be 797 g. of polymer/hour/g. of n-butyllithium. The polymer had a viscosity average molecular weight of 78,000 and infrared analysis showed the polymer structure to be 83% 1,2 units, 10% 1,4-trans units and 7% 1,4-cis units.

These results indicate that polymerizations can be carried out in the substantial absence of any diluent thereby achieving greater catalytic activity and polymers with microstructures comparable to those prepared in polymerization reactions carried out in the presence of diluents. The unconverted liquid monomer acts as the diluent and coolant (through refluxing) thus effecting substantial process economies over conventional processes. Furthermore, the polymeric products have a narrow viscosity average molecular weight range and accurate control of the polymer viscosity average molecular weight can be achieved by merely controlling the monomer to catalyst ratio.

Example 17

Following the procedure set forth in Example 1, Run B, isoprene is polymerized to a polymer containing a high ratio of 3,4-polyisoprene units. (The nomenclature in designating polyisoprene units is correctly termed 3,4 uints rather than "1,2 units" because addition takes place at the unbranched double bond.)

Example 18

Following the procedure as set forth in Example 5, piperylene is polymerized to a polymer containing a high ratio of 1,2-polypiperylene units.

Although the catalyst systems in the examples were prepared batchwise, it is obviously within the scope of this invention to prepare catalysts continuously or batchwise and to utilize either preparation in continuous or batch polymerizations.

Example 19

Five 250 ml. bottles fitted with septum caps were each charged with 100 ml. 2 M solution of butadiene in n-heptane (dried over calcium hydride). The bottles were attached to a shaker and placed in a bath to maintain either 0° C. or 25° C. 0.5–1 M stock solutions of butyllithium (0.2 mmole) and methyl dimethylaminoethyl ether (0.2 mmole) or N,N,N',N'-tetramethyl-1,2-ethanediamine (0.2 mmole) were added separately or after aging as shown in Table XI.

After 2 hours at 0° C. or 1 hour at 25° C., the reactions were terminated with 1 ml. methanol, washed with 10 ml. water, inhibited, dried over potassium carbonate, filtered quantitatively into a resin flask, and vacuum dried. The results are summarized in Table XI.

TABLE XI

| Run | A | B | C | D | E |
|---|---|---|---|---|---|
| n-Butyllithium, g | 0.0128 | 0.0128 | 0.0128 | 0.0128 | 0.0128 |
| Cocatalyst | (1) | (1) | (1) | (1) | (2) |
| Grams | 0.0206 | 0.0206 | 0.0206 | 0.0206 | 0.0232 |
| Catalyst Age at 27° C., min | 0 | 1.5 | 0 | 30 | 30 |
| Diluent | (5) | (5) | (5) | (5) | (5) |
| Milliliter | (6) | (6) | (6) | (6) | (6) |
| Butadiene-1,3, g | 10.8 | 10.8 | 10.8 | 10.8 | 10.8 |
| Reaction Temp., ° C | 0 | 0 | 25 | 25 | 25 |
| Reaction Time, hrs | 2 | 2 | 1 | 1 | 1 |
| Conversion, percent | 91 | 96 | 92 | 5.2 | 23 |
| g. Polymer/g. BuLi | 766 | 810 | 776 | 44 | 197 |
| $\bar{M}_n$ [3] | 9,873 | 15,064 | 21,463 | 3,180 | 9,306 |
| Polymer Structure [4]: | | | | | |
| Percent 1,2 | 83 | 83 | 80 | 80 | 78 |
| Percent 1,4-trans | 9 | 9 | 11 | 10 | 11 |
| Percent 1,4-cis | 8 | 8 | 9 | 10 | 11 |

[1] $CH_3OCH_2CH_2N(CH_3)_2$=Methyl dimethylaminoethyl ether.
[2] TMEDA=N,N,N',N'-tetramethyl-1,2-ethanediamine.
[3] Number average molecular weight determined by vapor phase osmometry at 130° C.
[4] Determined by the Hampton procedure; Anal. Chem. 21, 923 (1949).
[5] n-Heptane.
[6] 100 ml. 2M $C_4H_6$ solution in heptane.

Runs A, B and C show that high activity was obtained using the t-aminoether cocatalyst when the catalyst components were mixed in the presence of monomer (A and C) or aged only a short time (Run B). Aging 30 minutes resulted in extensive catalyst decomposition from reaction of the butyllithium with the t-aminoether as evidenced by the low activity of Run D compared to Run C. The greater stability of the di-tertiary amine system compared to the t-aminoether system is shown by the higher activity in Run E versus Run D wherein both catalysts were aged in 0.5 M solutions at 27° C. for 30 minutes. The polymer structures obtained using the t-aminoether were substantially similar to those obtained using the di-tertiary amine cocatalyst.

The advantages of this invention will be apparent to those skilled in the art. Novel nontransition metal catalyst systems of increased activity are made available for producing a new type of polyethylene of superior characteristics as regards molecular weight, tensile strength, linearity and receptiveness to commercially available dyes.

With the instant catalyst system, polydiolefins of increased ratios of 1,2 structure may be readily prepared. Moreover, by using the processes described hereinabove, one may readily obtain a polydiolefin with a pre-determined viscosity average molecular weight selected from the range of about 200 to about 500,000 or higher. These polydiolefins are useful as adhesives, molding resins, surface coatings, glass laminating resins, flexible and rigid foams, drying oils, etc.

It is to be understood that this invention is not limited to the specified examples which have been offered merely as illustrations and that modifications can be made without departing from the spirit of the invention.

What is claimed is:
1. A polymerization catalyst comprising an organometal which is selected from the group consisting of RLi and $R_2Mg$, wherein R is a monovalent hydrocarbon radical containing 1 to 16 carbon atoms, and a bifunctional Lewis base which is selected from the group having the general formulas:

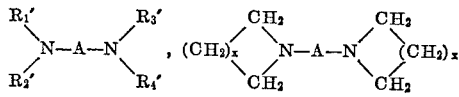

and

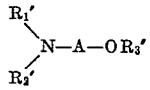

wherein $R_1'$, $R_2'$, $R_3'$ and $R_4'$ are alkyl radicals containing 1 to 4 carbon atoms inclusive, $x$ is an integer of 0 to 3 inclusive, and A is selected from the group consisting of: (a) cycloaliphatic and aromatic radicals and their lower alkyl derivatives having ring structures containing 5 to 7 members, wherein said radicals are attached to the nitrogen atoms at adjacent positions on the rings; (b) monoalkyl phosphorus radicals having 1 to 8 carbon atoms; (c) a monoethylenic radical, said radical containing 0 to 2 monovalent hydrocarbon radicals of 1 to 8 carbon atoms; (d) 1 to 4 methylenic radicals inclusive, wherein each radical contains 0 to 2 monovalent hydrocarbon radicals of 1 to 6 carbon atoms.

2. The catalyst of claim 1 wherein the organometal is an alkyllithium containing 2 to 6 carbon atoms.

3. The catalyst of claim 2 wherein the organometal is n-butyllithium.

4. The catalyst of claim 1 wherein the bifunctional Lewis base is an organic tertiary diamine having the general formula:

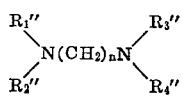

wherein $R_1''$, $R_2''$, $R_3''$ and $R_4''$ are alkyl radicals containing 1 to 3 carbon atoms inclusive and $n$ is an integer of 1 to 4 inclusive.

5. The catalyst of claim 4 wherein the bifunctional Lewis base in N,N,N',N'-tetramethyl-1,2-ethanediamine.

6. A polymerization catalyst prepared by (a) mixing an alkyllithium containing 2 to 6 carbon atoms with an organic tertiary diamine having the general formula:

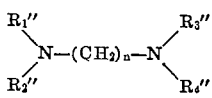

wherein $R_1''$, $R_2''$, $R_3''$ and $R_4''$ are alkyl radicals containing 1 to 3 carbon atoms inclusive and $n$ is an integer of 1 to 4 inclusive and (b) allowing said mixture to age until at least about 1 percent of the alkyl radical of the alkyllithium has been converted to its corresponding alkane.

7. A process for polymerizing monomers selected from the group consisting of (a) ethylene and (b) a $C_4$–$C_{12}$ conjugated diolefin which comprises contacting monomer (a), in the absence or presence of a $C_2$–$C_{20}$ saturated aliphatic or cycloaliphatic diluent at a temperature in the range of 0 to 100° C., with a polymerization catalyst; or contacting monomer (b), in the absence or presence of a $C_2$ to $C_{20}$ saturated aliphatic or cycloaliphatic or $C_6$ to $C_{20}$ aromatic diluent at a temperature in the range of —100 to 100° C., with a polymerization catalyst and thereafter recovering the homopolymeric products so produced, said polymerization catalyst comprising an organometal which is selected from the group consisting of RLi and $R_2Mg$, wherein R is a monovalent hydrocarbon radical containing 1 to 16 carbon atoms, and a bifunctional Lewis base which is selected from the group having the Formulas I and II in the case of monomer (a) and Formulas I, II, and III in the case of monomer (b):

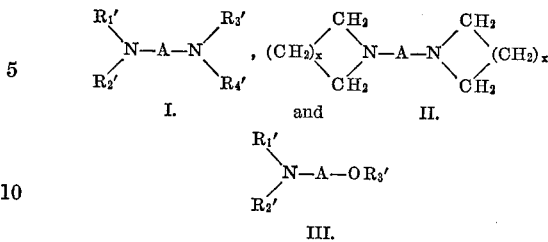

wherein $R_1'$, $R_2'$, $R_3'$ and $R_4'$ are alkyl radicals containing 1 to 4 carbon atoms inclusive, $x$ is an integer of 0 to 3 inclusive, and A is selected from the group consisting of: (1) cycloaliphatic and aromatic radicals and their lower alkyl derivatives having ring structures containing 5 to 7 members, wherein said radicals are attached to the nitrogen atoms at adjacent positions on the rings; (2) monoalkyl phosphorus radicals having 1 to 8 carbon atoms; (3) a monoethylenic radical, said radical containing 0 to 2 monovalent hydrocarbon radicals of 1 to 8 carbon atoms; (4) 1 to 4 methylenic radicals inclusive, wherein each radical contains 0 to 2 monovalent hydrocarbon radicals of 1 to 6 carbon atoms.

8. A homopolymerization process according to claim 7 wherein the sole monomer is ethylene.

9. A homopolymerization process according to claim 7 wherein the sole monomer is butadiene-1,3.

10. A process according to claim 7 wherein the organometal is an alkyllithium containing 2 to 6 carbon atoms.

11. A process according to claim 10 wherein the organometal is n-butyllithium.

12. A process according to claim 7 wherein the bifunctional Lewis base is an organic tertiary diamine having the general formula:

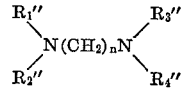

wherein $R_1''$, $R_2''$, $R_3''$ and $R_4''$ are alkyl radicals containing 1 to 3 carbon atoms inclusive and $n$ is an integer of 1 to 4 inclusive.

13. A process according to claim 12 wherein the bifunctional Lewis base is N,N,N',N'-tetramethyl-1,2-ethanediamine.

14. A process according to claim 7 wherein a conjugated diolefin, in the presence of a $C_6$–$C_{20}$ aromatic diluent, is contacted with a catalyst comprising a $C_2$–$C_6$ organolithium and an organic tertiary diamine having the general formula:

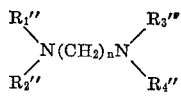

wherein $R_1''$, $R_2''$, $R_3''$ and $R_4''$ are alkyl radicals containing 1 to 3 carbon atoms inclusive and $n$ is an integer of 1 to 4 inclusive, and a substantially liquid polydiolefin is recovered from the reaction mixture.

15. A process for preparing a homopolymer of ethylene which comprises (a) mixing an alkyllithium having 2 to 6 carbon atoms with an organic tertiary diamine having the general formula:

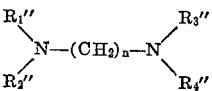

wherein $R_1''$, $R_2''$, $R_3''$ and $R_4''$ are alkyl radicals containing 1 to 3 carbon atoms inclusive and $n$ is an integer of 1 to 4 inclusive, (b) allowing said mixture to age until at least about 1 percent of the alkyl radical of the alkyllithium has been converted to its corresponding alkane, (c) contacting ethylene at a temperature in the range of about 0 to 100° C. with the aged mixture of (b), and (d) recovering a solid homopolymer of ethylene.

16. A homopolymer of ethylene prepared by the process of claim 15, said homopolymer containing at least 0.01% by weight of the homopolymer of basic nitrogen bound in the polymeric chain and having a Harris molecular weight of at least 40,000.

17. A catalyst system consisting essentially of a combination of non-aromatic tertiary amine, consisting of chelating diamines with LiR, wherein R is a hydrocarbon radical having about 1 to 16 carbon atoms selected from the group consisting of alkyl, cycloalkyl, alkenyl, phenyl, alkylphenyl and phenylalkyl.

18. A catalyst system according to claim 17 wherein said amine is N,N'-tetramethylethylene diamine.

19. A catalyst system according to claim 17 wherein said amine is N,N'-tetraalkyl-1,2-diaminocyclohexane.

20. Method of producing a homopolymer of ethylene which comprises contacting ethylene with an inert non-aromatic liquid reaction medium containing a catalyst prepared by combining an amine having the general formula:

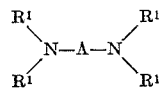

wherein $R^1$ is an alkyl radical, and A is selected from the group consistnig of: (a) monocycloaliphatic radicals wherein said radicals are attached to the nitrogen atoms at adjacent positions on the ring, and (b) —$CH_{2n}$ wherein $n$ is a number from 1 to 6, with LiR wherein R is a monovalent hydrocarbon radical having from 1 to 8 carbon atoms.

No references cited.

JOSEPH L. SCHOEFER, *Primary Examiner.*

M. B. KURTZMAN, *Assistant Examiner.*

U.S. Cl. X.R.

252—431; 260—82.1, 83.1, 84.7, 85.3, 88.2, 94.9, 680, 878, 879

PO-1050
(5/69)

UNITED STATES PATENT OFFICE
CERTIFICATE OF CORRECTION

Patent No. 3,451,988         Dated June 24, 1969

Inventor(s) Arthur W. Langer, Jr.

It is certified that error appears in the above-identified patent and that said Letters Patent are hereby corrected as shown below:

Column 2, line 4, cancel "are" and insert --is.

Column 3, line 33, cancel "porducts" and insert --products--.

Column 6, line 52, cancel "ploymer" and insert --polymer--.

Column 11, line 26, cancel "were" and insert --was--; line 27 cancel "catalysts" and insert --catalyst--.

Column 12, line 22, cancel "indicats" and insert --indicates- line 57, cancel "againg" and insert --aging--.

Column 13, line 1, cancel "cacatalysts" and insert --cocataly line 4, cancel "5" and insert --6--; line 8, cancel "5" and in --6--; line 17, cancel "5" and insert --6--; line 21, cancel "5 and insert --6--; line 29, cancel "carbon".

Column 17, line 1, cancel "aded" and insert --added--.

Column 24, line 15, cancel "No references cited." and insert:

-- References Cited

UNITED STATES PATENTS

| | | |
|---|---|---|
| 2,932,633 | 4/1960 Juveland | 260-94.9 |
| 3,036,056 | 5/1962 Rion | 260-94.7 |
| 3,206,519 | 9/1965 Eberhardt | 260-671 |

FOREIGN PATENTS

| | | |
|---|---|---|
| 614,149 | 2/1962 Belgium | 260-94.9 |
| 1,277,506 | 10/1961 France | 260-94.6 |

SIGNED AND
SEALED
APR 7 1970

(SEAL)
Attest:

Edward M. Fletcher, Jr.
Attesting Officer

WILLIAM E. SCHUYLER, JR.
Commissioner of Patents